(12) United States Patent
Nett et al.

(10) Patent No.: US 7,955,209 B2
(45) Date of Patent: Jun. 7, 2011

(54) DIFFERENTIAL GEAR

(75) Inventors: Hans-Peter Nett, Adenau (DE); Thomas Deigner, Pfedelbach (DE)

(73) Assignee: Getrag Driveline Systems GmbH, Köln (DE)

( * ) Notice: Subject to any disclaimer, the term of this patent is extended or adjusted under 35 U.S.C. 154(b) by 523 days.

(21) Appl. No.: 12/072,540

(22) Filed: Feb. 27, 2008

(65) Prior Publication Data

US 2008/0153652 A1 Jun. 26, 2008

(30) Foreign Application Priority Data

Aug. 30, 2005 (DE) .......................... 10 2005 041 152

(51) Int. Cl.
*F16H 37/08* (2006.01)
*F16H 48/06* (2006.01)
*F16H 3/44* (2006.01)
*F16H 57/08* (2006.01)

(52) U.S. Cl. ......... 475/205; 475/225; 475/323; 475/339

(58) Field of Classification Search .................... 475/18, 475/29, 30, 204, 205, 219, 221, 225, 223, 475/230, 231, 278, 302, 330, 337, 343, 198, 475/323, 339; 192/48.605, 48.606, 220
See application file for complete search history.

(56) References Cited

U.S. PATENT DOCUMENTS

| 5,080,640 | A  | * | 1/1992  | Botterill ......................... | 475/231 |
| 6,056,660 | A  | * | 5/2000  | Mimura ......................... | 475/205 |
| 6,120,407 | A  |   | 9/2000  | Mimura |         |
| 6,951,522 | B2 | * | 10/2005 | Baxter et al. .................. | 475/205 |
| 2006/0172847 | A1 | * | 8/2006 | Gradu ........................... | 475/230 |

FOREIGN PATENT DOCUMENTS

FR   2 864 190 A1   6/2005
JP   11 315905 A    11/1999

* cited by examiner

*Primary Examiner* — Roger Pang
(74) *Attorney, Agent, or Firm* — Brinks Hofer Gilson & Lione

(57) ABSTRACT

A differential gear having first and second driven shafts connected with a drive cage via a planetary or differential gear and a stationary gear housing. An intermediate gear with a planetary unit is provided with the first driven shaft, wherein the planetary unit includes a planetary wheel support and a planetary wheel pair having a first planetary wheel and a second planetary wheel. The first and second planetary wheels having different effective diameters, wherein the planetary wheel pair is arranged on planetary wheel pair shafts. A first sun wheel engaged with the first planetary wheel and a second sun wheel arranged coaxially with the first sun wheel. A brake device including a braking force applicator and a braking torque that brakes the planetary unit with respect to the stationary gear housing, and wherein the planetary unit includes active surfaces for introducing the breaking torque into the planetary unit.

14 Claims, 2 Drawing Sheets

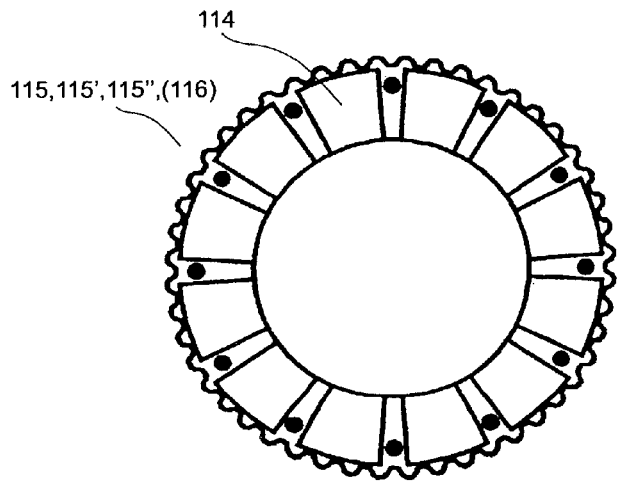
Fig. 3
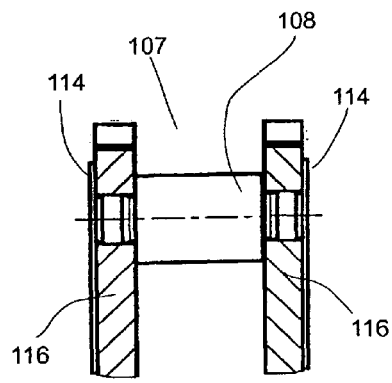
Fig. 4
Vehicle Data
| | |
|---|---|
| $R_{dyn}=$ | 0,315 |
| $i_{Achs}=$ | 3.5 |
Gear Data
| | |
|---|---|
| $r_1=$ | 30 |
| $r_2=$ | 20,00 |
| $r_4=$ | 28,85 |
| $r_3=$ | 21,2 |
| $r_{steg}=$ | 50,000 |
| V [km/h] | $n_{Propshaft}$ [min⁻¹] | $n_{Diff}$ [min⁻¹] | $\Delta n$ [%] | $n_{RL}$ [min⁻¹] | $n_{Steg}$ [min⁻¹] | $n_{23/Steg}$ [min⁻¹] | $\Delta T_4$ [Nm] | $T_1$ [Nm] | $T_K$ [Nm] | $P_{verl.}$ [KW] |
|---|---|---|---|---|---|---|---|---|---|---|
| 200 | 5895 | 1684 | 0 | 1684,18 | 1684,2 | 0 | 1200 | 1320,02 | 120 | 21,17 |
| 200 | 5895 | 1684 | 5 | 1768,39 | 842,2 | 1263 | 1200 | 1320,02 | 120 | 10,58 |
| 200 | 5895 | 1684 | 10 | 1852,6 | 0,2 | 2526 | 1200 | 1320,02 | 120 | 0,00 |
| 100 | 2947 | 842 | 0 | 842,09 | 842,1 | 0 | 1200 | 1320,02 | 120 | 10,58 |
| 100 | 2947 | 842 | 5 | 884,194 | 421,1 | 631 | 1200 | 1320,02 | 120 | 5,29 |
| 100 | 2947 | 842 | 10 | 926,299 | 0,1 | 1263 | 1200 | 1320,02 | 120 | 0,00 |
| 50 | 1474 | 421 | 0 | 421,045 | 421,0 | 0 | 1200 | 1320,02 | 120 | 5,29 |
| 50 | 1474 | 421 | 5 | 442,097 | 210,6 | 316 | 1200 | 1320,02 | 120 | 2,65 |
| 50 | 1474 | 421 | 10 | 463,149 | 0,1 | 631 | 1200 | 1320,02 | 120 | 0,00 |
Fig. 5

DIFFERENTIAL GEAR

RELATED APPLICATIONS

Applicants claim, under 35 U.S.C. §120, the benefit of priority of the filing date of Aug. 30, 2006 of Patent Cooperation Treaty patent application no. PCT/EP20006/008486, filed on the aforementioned date, the entire contents of which are incorporated herein by reference.

Applicants claim, under 35 U.S.C. §119, the benefit of priority of the filing date of Aug. 30, 2005 of a German patent application, copy attached, Serial Number 10 2005 041 152.5, filed on the aforementioned date, the entire contents of which is incorporated herein by reference.

BACKGROUND

1. Technical Field

The present invention relates to a differential gear for a motor vehicle, having a powered drive cage, two driven shafts, connected with the drive cage via a planetary or differential gear, as well as a stationary gear housing. An intermediate gear with a planetary unit is provided per driven shaft, the planetary unit includes a plurality of planetary wheel pairs and a planetary wheel support, the planetary wheel pairs are arranged on planetary wheel pair shafts, which are connected with the planetary wheel support and each has a first planetary wheel and a second planetary wheel. The first planetary wheel and the second planetary wheel are arranged coaxially with respect to each other and are connected with each other in a manner fixed against relative rotation and the first planetary wheel and the second planetary wheel have different effective diameters. In addition, the first planetary wheel is in engagement with a first sun wheel, which is connected with the drive cage in a manner fixed against relative rotation, and the second planetary wheel is in engagement with a second sun wheel, which is connected with the driven shaft in a manner fixed against relative rotation and arranged coaxially with respect to the first sun wheel. A brake device is provided, which has a breaking force applicator which causes a breaking action, and the braking torque is capable of braking the planetary unit with respect to the stationary gear housing, and wherein the planetary unit has active surfaces provided for introducing the breaking torque into the planetary unit.

2. Background Information

Differential gears are used for the transverse compensation of the different number of revolutions of the wheels which results from the different lengths of the tracks when driving around curves. In the course of this, it is intended as a rule to transfer the driving action symmetrically, and therefore free of yawing action, to the individual wheels. However, it can be desirable in certain driving situations, or for affecting the driving characteristics of a motor vehicle, to interfere in a definite manner with the driving power distribution to the individual wheels, and in this way to optimize the driving behavior, or to aid the driver in critical driving situations. This can be provided by brake engagement, as well as by affecting the distribution of the propulsive power from a differential gear to the individual wheels.

A differential gear of the type mentioned at the outset is distinguished in that the planetary unit, which normally rotates along with the drive cage and driven shaft, can be braked or blocked when the brake device is operated.

With the brake device not operated, the planetary unit rotates as a block around the driven shaft. The differential gear performs the functions of a conventional differential. When the brake device is activated, and since the individual planetary wheels of the planetary wheel pairs have differently effective diameters, a torque is transmitted via the intermediate gear to the driven shaft as a result of the braking of the planetary unit which, in comparison with the operation when the brake device is not activated, accelerates or decelerates the driven shaft. A yawing action is intentionally created by this, which is generated on both sides of the vehicle because of the different number of revolutions of the drive wheels, or because of the different drive wheel moments, or number of revolutions of the drive wheels resulting therefrom. In contrast to differentials which merely have an active blocking device which, at full blocking power, permits a maximal synchronization of the number of revolutions of the driven shafts, it can be achieved that even the drive wheel at the outside of the curve which, in conventional differentials, rotates faster than the drive wheel on the inside of the curve because of the longer outer track, is accelerates past the number of wheel revolutions resulting from the track length.

By a defined addition of a yawing action it is possible to interfere in a corrective manner with the driving behavior of the vehicle in various driving situations, or it is possible to create a vehicle with special driving properties, in particular with special curve-steering behavior. Such gears are also called "active yaw" gears because of the option of introducing a yawing action.

Such a differential gear is known from U.S. Pat. No. 6,120,407, the entire contents of which are incorporated herein by reference. In this differential gear, the planetary unit can be braked via a braking device arranged on an outer shell face of a disk-shaped base body of the planetary support. For this purpose the braking device has a stack of friction disks, which can be compressed by a hydraulic unit. In this case active surfaces in the form of interior disks are provided on the planetary support and are arranged, fixed against relative rotation, on the planetary support acting as the inner disk support, while the outer disks are arranged, fixed against relative rotation, on the stationary gear housing.

However, this embodiment has the disadvantage that the braking device and the active surfaces are spaced far apart from the planetary unit, which results in a planetary unit which is structurally elaborate, large, and therefore also comparatively heavy and expensive. The mass of the planetary unit which is to be accelerated and braked is relatively large. Such an embodiment also requires an increased demand for structural space for the entire differential gear. Added to this is that, because of the differing diameters of the first and second planetary wheel, the forces acting on them impart a torque to the planetary unit which, in the known embodiment, must be absorbed by an elaborate seating of the planetary unit. Furthermore, an elaborate axial seating of the planetary unit is also required for the positionally correct seating of the braking device.

OBJECTS AND SUMMARY OF THE INVENTION

It is an object of the present invention to design a differential gear of the type mentioned at the outset in such a way that the disadvantages in connection with the prior art are avoided. The differential gear should be capable of being manufactured in a compact, easily adjustable and simple and cost-effective manner. It should moreover have a long service life, be distinguished by low structural space requirements and little constructive complexity, and should result in a favorable degree of effectiveness as well.

In accordance with the present invention this object is attained in that the active surfaces are provided on both sides of the planetary wheel pairs and are arranged, at least in part, laterally at the side of the planetary wheel pairs.

A compact structure is made possible by this arrangement of the active surfaces. The braking power can act directly on the side of the planetary unit. No arrangement of the braking device at a location far distant from the axis of rotation of the intermediate gear is required. The masses which are to be moved are reduced in the outer area of the planetary unit. By arranging the active surfaces at both sides of the planetary unit it is achieved that the forces and torques acting on the planetary unit in the course of its operation via the planetary wheel pairs act on the braking device directly via the active surfaces and are absorbed by it. The braking power and braking torque act directly on the planetary unit without having to be conducted to a radially outwardly seated braking device via a planetary support which is constructively complexly designed. Also, an elaborate axial seating is omitted because of this. Exact positioning of the planetary unit is assured because of the braking device directly adjoining the active surfaces.

Because of the low structural space requirements, the simpler structural design and the lower weight, the embodiment in accordance with the present invention also saves costs, both in operation and in development and manufacture. Moreover, the lower weight and the more compact structural form result in a more stable and lighter planetary unit in comparison with the prior art, so that actions of the braking device can take place more dependably, more precisely, faster and better distributed. The control and monitoring of the actions is thus optimized.

For introducing the braking power and braking torque into the planetary unit it is furthermore provided that the braking device has friction disks on both sides of the planetary unit. Friction disks have a friction coating layer, which is conventionally applied to a base body, and through which the required braking torque can be transferred in a very efficient manner to the planetary unit via the active surfaces. Furthermore, in comparison with other measures for introducing a braking torque, friction disks have a very high performance-to-weight ratio and low space requirements, simultaneously along with low costs and a long service life, which contributes to compactness and structural simplicity of the differential gear.

In a preferred embodiment, at least the friction disk facing the braking power applicator is displaceable in the form of a force-introduction disk in the direction of the driven shaft axis and transmits the braking power to the active surfaces of the planetary unit facing it. In this way the play required for the free rotatability of the planetary unit can be bridged by the force-introduction disk before the active surfaces of the planetary unit rest against the braking device and are effectively braked.

For further constructively simplifying the differential gear, it is preferably provided that the braking power applicator is arranged on only one side of the planetary unit, and that the friction disk arranged on the other side of the planetary unit is designed as a support disk, which counteracts the braking power and the braking torque at the stationary gear housing. An arrangement of the braking power applicator to both sides of the planetary unit is not necessarily required. In the course of slowing down the planetary unit, which as a whole rotates around the driven shaft, it is initially minimally displaced by the amount of its lateral play by the effect of the braking power, until it firmly rests with its side opposite the braking power applicator against the adjoining friction disk side. Thereafter, the braking power can act symmetrically on the planetary unit.

The torque transferred to the planetary unit must be supported on the stationary gear housing. In an advantageous manner this can be achieved in that the friction disks are arranged, fixed against relative rotation, in the stationary gear housing. In that case the support of the braking torque takes place via the friction disks. No torque is transferred to other portions of the braking device. These can be laid out and conceptualized in a correspondingly simpler manner.

Since in contrast to the force-introduction disk, the support disk need not be displaceable in an axial direction as long as it rests against the gear housing at the same time, it can be provided that the support disk is fixedly connected with the stationary gear housing. In particular, the support disk can be constituted by applying the friction coating directly to the surface of the stationary gear housing. For example, it can be screwed together with it or glued to it. Construction is further simplified by this and components and costs are saved.

In order to further improve the introduction of the braking torque into the planetary unit it can be provided for the active surfaces of the planetary unit to have a friction coating in the manner of the friction coating of a friction disk. In this way it is possible to obtain a very efficient friction surface pairing, which further improves the reaction properties and the ability to regulate it.

It can be furthermore provided that the planetary wheel support has a support ring at least on one side, which is designed in the manner of a friction disk, wherein the active surface on the side of the support ring facing away from the planetary wheel pairs is provided with a friction coating for working together with the friction disks of the braking device. Thus, as a unit such a support ring constitutes a structural element suitable for holding and receiving the planetary wheel pairs, as well as for the introduction of the braking torque.

The friction coating can be glued or screwed to the support ring. The planetary support is advantageously constructed to be as symmetrical as possible and has the support ring on both sides. The planetary wheel pair shafts are arranged on the support ring and are fixedly connected with the support ring, in particular screwed, riveted or welded to it.

The braking device can be advantageously arranged in the stationary gear housing. The latter is substantially arranged fixed in place on the motor vehicle, and the power transfer means required for actuating the braking device, for example hydraulic fluid, compressed air or electrical energy, can be introduced into the stationary gear housing without having to seal components which are being moved in relation to each other, or without wiper contacts.

The braking power applicator causing the braking torque preferably include a hydraulic unit with at least one pressure cylinder arranged in or on the stationary gear housing and a pressure piston acting on a force-introduction disk. Such an arrangement transfers the braking power via the pressure piston and the force-introduction disk to the planetary unit, wherein the braking torque is picked up by the force-introduction disk and, provided the force-introduction disk is arranged, fixed against relative rotation, on the stationary gear housing, it is also supported by the latter. In this way the pressure pistons do not come into direct contact with the active surfaces of the planetary unit and can be designed in a structurally simpler manner, since they do not have to absorb a torque. Preferably, several pressure pistons are distributed over a circumference for the even application of the braking power into the planetary unit, or a ring-shaped piston is provided, which can rest evenly against the force-introduction disk when the braking device is actuated.

An embodiment is particularly advantageous in which the pressure pistons and the force-introduction disk form a single component. The pressure pistons can be connected with the force-introduction disk by releasable or non-releasable connectors, in particular screwed, riveted or welded. It can be provided for the force-introduction disk and the pressure pistons to be a single component, like a support ring with the planetary wheel pair shafts arranged on it, which contributes to a further simplification of the differential gear.

Preferably, $0.85 < i_o < 0.95$, further preferred $0.89 < i_o < 0.91$, is selected for the standard transmission ratio, $i_o$, of the intermediate gear. The standard transmission ratio is the transmission ratio resulting when the planetary unit is blocked so that the driven shaft (item 2 of FIG. 1, for example) can rotate at a different rate in a particular direction than the drive cage (item 1 of FIG. 1, for example) rotating in the same direction. It describes the ratio between the number of revolutions of the drive cage and the number of revolutions of the driven shaft. In other words, the transmission ratio is the number of revolutions of the drive cage during an interval of time divided by the number of revolutions of the driven shaft during the same interval of time. If the intermediate gear is not intended to accelerate the respective driven shaft assigned to it, but to slow it down, a standard transmission ratio corresponding to the mentioned standard transmission ratio which is greater than 1 can be selected, so that then the respectively other driven shaft is accelerated by the compensation of the numbers of revolutions in the planetary or differential gear.

A relation Z between the effective diameter of the first planetary gear and the effective diameter of the second planetary wheel can be established. For example, the relation Z can be the ratio of the effective diameter of the first planetary gear divided by the effective diameter of the second planetary wheel, wherein the ratio should be 0.90 to 0.98, preferably 0.93 to 0.95, further preferred 0.94. A relation S between the effective diameter of the first sun wheel and the effective diameter of the second sun wheel can be established. For example, the relation S can be the ratio of the effective diameter of the first sun wheel divided by the effective diameter of the second sun wheel, wherein the ratio should be 1.01 to 1.07, preferably 1.03 to 1.05, further preferred 1.04. A relation $R_1$ of the effective diameter between the effective diameter of the first sun wheel and the effective diameter of the first planetary wheel can be established. For example, the relation $R_1$ can be the ratio of the effective diameter between the effective diameter of the first sun wheel divided by the effective diameter of the first planetary wheel, wherein the ratio should be 1.4 to 1.5, preferably 1.48 to 1.52, further preferred 1.50. A relation $R_2$ between the effective diameter of the second planetary wheel and the effective diameter of the second sun wheel can also be established. The relation $R_2$ can be the ratio of the effective diameter of the second planetary wheel divided by the effective diameter of the second sun wheel, wherein the ratio should be 0.68 to 0.78, preferably 0.72 to 0.74, further 0.735. These standards make possible a compact structure with sufficient active surfaces for introducing the braking torque, the desired standard transmission, as well as a good degree of effectiveness.

The application of the present invention is of course not limited to the represented bevel differential gear arrangement. Other differential gear constructions, such as a spur gear differential, in particular in a planetary construction, or worm gear differentials, are also considered to relate to the invention. Moreover, the employment in a transfer case gear is also conceivable, if it is intended to accelerate or slow down the front and rear axles differently for a specific intervention in the driving dynamics of a vehicle. A differential gear in accordance with the present invention can be employed alternatively or additionally to other regulating systems, such as electronic stabilization programs, for example.

Further characteristics and advantages of the present invention ensue from the following description of preferred embodiments, making reference to the drawings.

Shown in the drawings are in:

BRIEF DESCRIPTION OF THE DRAWINGS

FIG. 3 shows a top view of an embodiment of a force-introduction disk or planetary wheel support;

FIG. 4 shows a lateral view of the planetary wheel support of FIG. 3 in a sectional view; and FIG. 5 shows an overview of the possible dimensioning of the differential gear of FIG. 1 in accordance with the present invention.

DETAILED DESCRIPTION OF THE PREFERRED EMBODIMENTS

Figure 1:
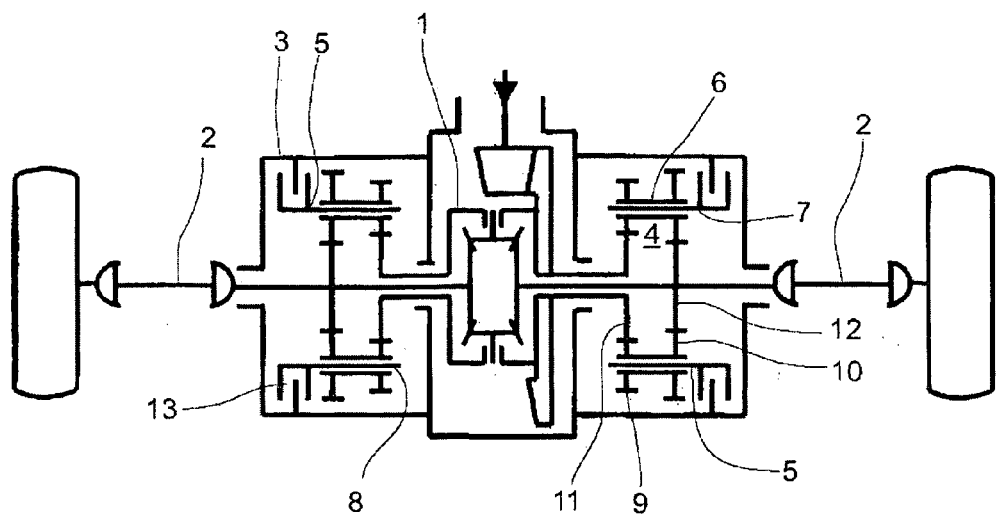
FIG. 1 shows a schematic representation of a previously known differential gear in accordance with the prior art.

A schematic representation of a previously known differential gear, which is used for explaining the general functioning, is represented in FIG. 1. Propulsive power is introduced into the drive cage 1 and is distributed there onto two driven shafts 2 in a manner known in connection with differentials. The structure of the differential gear is substantially symmetrical on both driven sides. In addition, the driven shafts 2 are coupled with the drive cage 1 by respective intermediate gears 4. The differential, drive cage 1, driven shafts 2 and intermediate gears 4 are at least partially arranged and seated in a stationary gear housing 3.

Each intermediate gear 4 has a planetary unit 5 which, for example in case of yawing action-free straight-ahead running, rotates as a unit with the drive cage 1 and driven shaft 2. The planetary units 5 include a plurality of planetary wheel pairs 6, planetary wheels 9, 10, planetary wheel support 7, planetary wheel pair shafts 8 and support ring 16. The plurality of planetary wheel pairs 6 are usefully arranged at regular spacings along the circumference. Two planetary wheel pairs 6 can be seen in FIG. 1 per intermediate gear 4 and planetary unit 5. These are respectively arranged on a planetary wheel pair shaft 8, which is connected with a planetary wheel support 7. Each planetary wheel pair 6 has a first planetary wheel 9 and a second planetary wheel 10. The first planetary wheel 9 meshes with a first sun wheel 11, which is connected, fixed against relative rotation, with the drive cage 1, the second planetary wheel 10 meshes with a second sun wheel 12 connected, fixed against relative rotation, with the respective driven shaft 2.

FIG. 1 furthermore shows a braking device 13 per driven side, which can transmit braking power to the planetary unit 5. The braking device 13 acts between the stationary gear housing 3 and the planetary unit 5.

If now the planetary unit 5 is braked, or blocked, on a driven side, the planetary unit 5 can no longer freely rotate, or it stands still with respect to the stationary gear housing 3. The first sun wheel 11, which is directly driven by the propulsive power via the drive cage 1, drives the driven shaft 2 via the first planetary wheel 9 and the second planetary wheel 10, which is connected with the latter in a manner fixed against relative rotation. A transfer of power from the drive cage 1 to the driven shaft 2 via the intermediate gear 4 is assured. The different number of revolutions being forced between the two driven shafts is compensated by the differential. With the blockage of the planetary unit 5, the ratio between the number of revolutions of the drive cage 1 and the number of revolutions of the driven shafts 2, as well as the ratio between the number of revolutions of the driven-shafts 2 with respect to each other, is fixed, regardless of travel around curves or straight ahead. The simultaneous blockage of both intermediate gears 4 on both driven sides is not possible.

The braking devices 13 can be seen in FIG. 1 on only one side of the planetary unit 5 and they are arranged relatively far from the driven shaft axes, which leads to the disadvantages mentioned at the outset.

Figure 2:
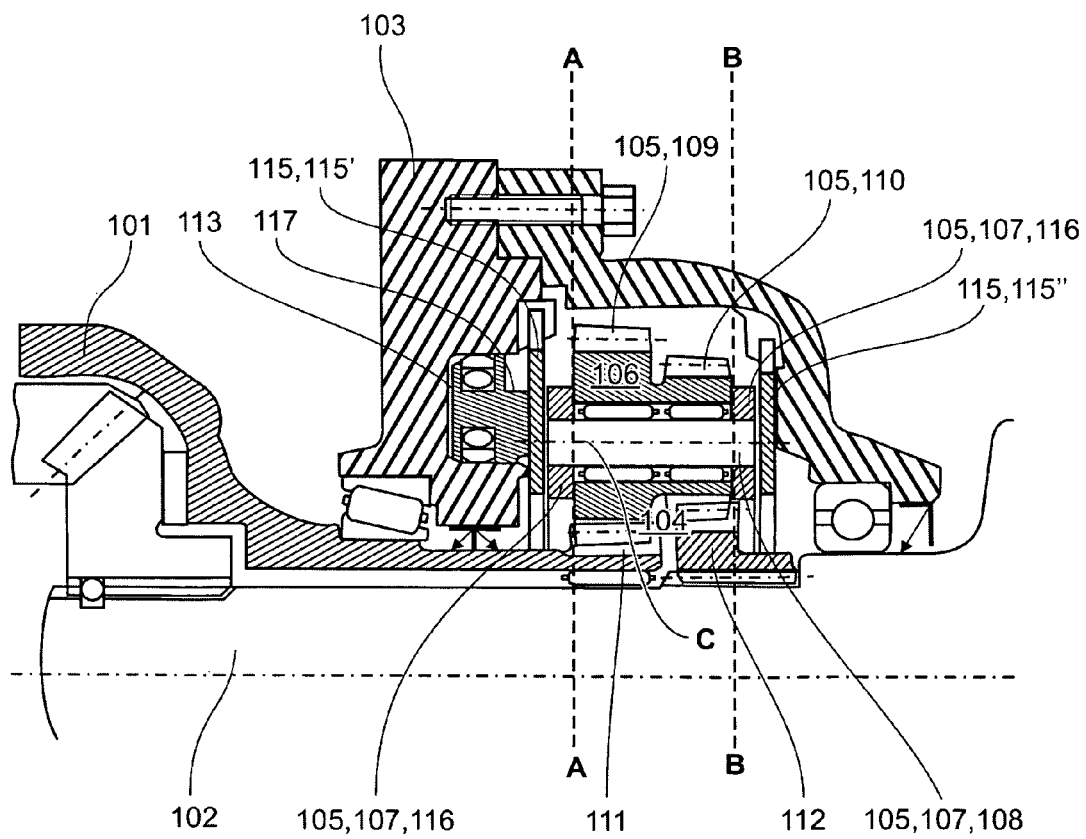
FIG. 2 shows an embodiment of a differential gear in accordance with the present invention.

An exemplary embodiment of the differential gear in accordance with the present invention is represented in FIG. 2. Only one driven side of the differential gear is represented. The drive side (not represented) drives the drive cage 101 via bevel gear teeth. The drive cage 100 is rotatably seated with respect to the stationary gear housing 103. At the end of the latter the first sun wheel 111 is arranged and is in engagement with the first planetary wheel 109. The first planetary wheel 109 is connected, fixed against relative rotation, with the second planetary wheel 110 to form the planetary wheel pair 106 and is arranged coaxially with it. The second sun wheel 112 is in engagement with the second planetary wheel 110, which in turn is connected, fixed against relative rotation, with the driven shaft 102.

The represented planetary wheel pair 106 is rotatably seated on the planetary wheel pair shaft 108 and can rotate around it. The planetary wheel pair shaft 108 is respectively connected on both sides with a support ring 116. The planetary wheel support 107 includes the support rings 116 and planetary wheel pair shafts 108; furthermore, the planetary unit 105 also includes the planetary wheel pairs 106.

A friction disk 115, which is designed as a force-introduction disk 115', is arranged on the side of the left support ring 116. The braking device 113, shown by way of example in FIG. 2 as a hydraulic braking device, applies a braking force to the force-introduction disk 115' via a pressure piston 117. The disk is designed in a ring shape and, by teeth at its outer rim, is seated fixed against relative rotation, but is displaceable in the stationary gear housing in the direction of the axes of rotation of the driven shaft 102, the drive cage 101 and the intermediate gear 104. The braking device 113 is usefully designed in such a way that it is capable of exerting an even pressure on the force-introduction disk.

A friction disk 115 is also provided on the side of the right support ring 116 and is designed as a support disk 115". The support disk 115" is also arranged in the stationary gear housing 103 fixed against relative rotation and displaceable in the same direction as the force-introduction disk 115'. However, the displaceability of the support disk 115" is not important for the functioning of the differential gear. The support disk 115" can also rest directly on the stationary gear housing 103, or can be fixed in place on it, so that it is possible to omit a support disk 115" as a separate component.

Active surfaces are provided on the support rings 116. These are the surfaces via which the braking power and the braking torque are introduced into the planetary unit 105. They are preferably located at both sides of the planetary wheel pairs 106 on the lateral faces of the support rings 116 facing the friction disks 115. As shown in FIG. 2, the active surfaces of support rings 116 are entirely within areas located to the left of plane A and to the right of plane B. As shown in FIG. 2, the planes A and B are laterally spaced from the planetary wheel pairs 106 and are perpendicularly intersected by an axis of rotation C of the planetary wheel pairs 106. In addition, the planetary wheel pairs 106 are substantially positioned between the left and right areas defined by planes A and B mentioned previously. Furthermore, as shown in FIG. 2, the active surfaces do not extend beyond a height of the planetary wheel pairs 106 as defined in a direction perpendicular to the axis of rotation C. In this case the lateral faces of the support rings 116 can be used as active surfaces either as a whole or only partially. Friction surfaces, which in type correspond to the friction surfaces of the friction disks 115, are preferably applied as active surfaces to the lateral faces of the support rings 116.

A compact, easily controllable, light and cost-effective differential gear is created by means of the above described embodiment. Because of its simple construction, it also has a long service life and is distinguished by low structural space requirements and low constructive complexity.

The friction disks 115 arranged on both sides of the planetary unit 105 and received in the stationary gear housing 103 with little play toward the sides, assure a stable seating of the planetary unit 105 by constituting abutments. The forces and torques occurring in the intermediate gear 104, which appear in particular in the course of slowing down or blocking the planetary unit by the braking device 113, i.e. in the course of employment of the intermediate gear 104, are effectively caught by the components arranged on both sides of the planetary unit 105 and are introduced into the stationary gear housing 103. Therefore, as represented in FIG. 2, the planetary unit 105 makes do without additional axial seating. A rapid and efficient controllability of an intervention by the braking device results from the compact construction and the low masses caused by this.

FIG. 3 shows an embodiment of a friction disk 115 in a view from above. Friction surfaces can be seen at the front, which are evenly distributed over the circumference and face the active surfaces of the planetary unit. Teeth are located on the outer rim, which make possible seating in the stationary gear housing in a manner fixed against relative rotation and at the same time axially displaceable. In connection with a special embodiment of the differential gear it is provided that the friction disk 115 represented in FIG. 3 is used as a component which is structurally identical, or is at least of a type which can also be used as a support ring 116. The friction disks 115 can be dry or wet disks. Wet disks in the manner of hydraulic coupling disks are preferably employed.

FIG. 4 shows a possible embodiment of a planetary wheel support 107 with two support rings 116, which substantially correspond to the embodiment of the friction disks 115 represented in FIG. 3. The planetary wheel pair shaft 108 is shown between the support rings 116 and is fixedly connected with them, on which, as can be seen in FIG. 2, the planetary wheel pairs 106 are rotatably seated. Moreover, the planetary wheel pair shafts 108 keep the support rings 116 spaced apart when the braking force is active in order to assure the free rotatability of the planetary wheel pairs. To assure an even load on the support rings 116, it is possible to provide further support elements, which prevent deformation, and therefore uneven loads on the active surfaces of the support rings 116 when a braking force occurs. A friction coating similar to a friction disk has been applied to the lateral faces of the support rings 116.

FIG. 5 represents an overview of the dimensioning, shown by way of example, of a differential gear. The dynamic tire radius $R_{dyn}=0.315$ m, and the axle ratio $i_{axles}=3.5$ have been stated arbitrarily, but realistically, as the vehicle data. Note that the terms dynamic tire radius and axle ratio are terms well known in the art. For example, the dynamic tire radius is defined to be the true effective tire radius when the tire/the vehicle is actually in use versus the nominal tire radius of the tire when no forces are acting on the tire. When the vehicle is driven, the radius of the tire changes based on the weight of the vehicle and the speed of the vehicle and thus such a radius is referred to the dynamic radius. The weight of the vehicle compresses the part of the tire touching the road and so the radius is diminished. In contrast, increasing the speed of the tire will generate a centrifugal force that causes the tread of the tire to move away from the axis of revolution and so the radius of the tire increases. The overall value of the dynamic radius can be obtained in a well known manner based on a calculation involving the distance driven by the vehicle and the number of revolutions the tire made during that distance.

The definition of axle ratio is that it is the ratio of the effective drive cage gear radius divided by effective drive shaft gear radius or in other words the ratio of the number of drive shaft revolutions divided by the number of tire revolutions when both tires rotate with the exact same number of revolutions.

In FIG. 5, the radius of the first sun wheel is $r_1=30$ mm, that of the first planetary wheel $r_2=20$ mm, that of the second planetary wheel $r_3=21.2$ mm, and finally that of the second sun wheel $r_4=28.85$ mm. The path radius, i.e. the radius over which the planetary wheel pairs 106 rotate around the driven shaft axis, or the radius at which the planetary wheel pair shafts 108 are spaced apart from the driven shaft axis, is $r_{shaft}=50$ mm.

From this, a ratio Z of the effective diameter between the first planetary wheel and the effective diameter of the second planetary wheel of 0.94 results, and a ratio S between the effective diameter of the first sun wheel and the effective diameter of the second sun wheel of 1.04. The ratio $R_1$ between the effective diameter of the first sun wheel and the effective diameter of the first planetary wheel is 1.50, while the ratio $R_2$ between the effective diameter of the second planetary wheel and the effective diameter of the second sun wheel is 0.735. Based on this information, the standard transmission ratio of the intermediate gear follows as $i_o=0.907$.

If these values are made the basis, it is possible to calculate for the driven side while, inter alia, taking the following values, which can be taken from the table in FIG. 5 into consideration, for respectively assumed vehicle speeds V:

$n_{propshaft}$ (number of driveshaft revolutions or engine rpm)
$n_{Diff}$ (number of revolutions of the drive cage)
$\Delta n$ (relative difference rpm between driven shaft and drive cage)
$n_{RL}$ (driven shaft rpm)
$n_{Steg}$ (rotary rpm of the planetary unit)
$n_{23/Steg}$ (number of revolutions of the planetary wheel pairs around the planetary wheel pair shaft)

Besides the above data, the table in FIG. 5 contains an estimated calculation of the power loss $P_{Verl}$ caused by the differential gear or the braking device at the respective driving speeds V. The calculation is respectively based on an assumed driven torque of a driven shaft of $\Delta T_4=1200$ Nm and, following from this, because of the standard transmission ratio of the intermediate gear of $i_o=0.907$, a drive torque of the drive cage of $T_1=1320$ Nm. According to the standard transmission ratio of the intermediate gear of $i_o=0.907$, the coupling torque $T_K$, i.e. the braking torque acting on the planetary unit, is approximately 10% of $\Delta T_4=1200$ Nm, i.e. $T_K=120$ Nm.

List of Reference Numerals

1; 101 Drive cage
2; 102 Driven shaft
3; 103 Stationary gear housing
4; 104 Intermediate gear
5; 105 Planetary unit
6; 106 Planetary wheel pair
7; 107 Planetary wheel support
8; 108 Planetary wheel pair shaft
9; 109 First planetary wheel
10; 110 Second planetary wheel
11; 111 First sun wheel
12; 112 Second sun wheel
13; 113 Braking device
114 Active surfaces
115 Friction disk
115' Force-introduction disk
115" Support disk
116 Support ring
117 Pressure Piston The foregoing description is provided to illustrate the invention, and is not to be construed as a limitation. Numerous additions, substitutions and other changes can be made to the invention without departing from its scope as set forth in the appended claims.

We claim:

1. A differential gear for a motor vehicle, comprising:
a powered drive cage;
a first driven shaft and a second driven shaft connected with the drive cage via a planetary or differential gear;
a stationary gear housing;
an intermediate gear with a planetary unit is provided with the first driven shaft, the planetary unit comprising:
  a planetary wheel support; and
  a planetary wheel pair comprising a first planetary wheel and a second planetary wheel arranged coaxially with respect to each other and are connected with each other so as to be fixed against rotation relative to each other, the first planetary wheel and the second planetary wheel having different effective diameters, wherein the planetary wheel pair is arranged on planetary wheel pair shafts, which are connected with the planetary wheel support;
a first sun wheel, which is connected with the drive cage so as to be fixed against rotation relative to the drive cage and is engaged with the first planetary wheel;
a second sun wheel, which is connected with the second driven shaft so as to be fixed against rotation relative to the second driven shaft and is arranged coaxially with the first sun wheel;
a brake device comprising:
  a breaking force applicator which causes a breaking action that generates a braking torque that brakes the planetary unit with respect to the stationary gear housing, and wherein the planetary unit comprises active surfaces for introducing the breaking torque into the planetary unit, wherein the active surfaces are provided within a first area defined by a first plane laterally spaced from the planetary wheel pair and within a second area defined by a second plane laterally spaced from the planetary wheel pair, wherein the planetary wheel pair is substantially positioned between the first and second areas and the first and second planes are perpendicularly intersected by an axis of rotation of the planetary wheel pair;
  a first friction disk at the first area and a second friction disk at the second area, wherein the first friction disk and the second friction disk introduce the braking torque into the planetary unit, wherein the braking force applicator is arranged at only the first area and the second friction disk arranged at the second area is designed as a support disk, which counteracts a braking power and the braking torque at the stationary gear housing.

2. The differential gear in accordance with claim 1, wherein the first friction disk faces the braking power applicator and is displaceable as a force-introduction disk in a direction of an axis of the second driven shaft and transmits braking force to at least one of the active surfaces of the planetary unit facing the first friction disk.

3. The differential gear in accordance with claim 1, wherein the first and second friction disks are arranged, fixed against relative rotation, in the stationary gear housing.

4. The differential gear in accordance with claim 1, wherein the second friction disk is fixedly connected with the stationary gear housing.

5. The differential gear in accordance with claim 1, wherein the active surfaces of the planetary unit have a friction coating applied to a base body, and through which a required braking torque can be transferred to the planetary unit via the active surfaces.

6. The differential gear in accordance with claim 1, wherein the brake device is arranged in the stationary gear housing.

7. The differential gear in accordance with claim 2, wherein the braking force applicator comprises:
 a hydraulic unit with at least one pressure cylinder arranged in or on the stationary gear housing; and
 a pressure piston acting on a force-introduction disk.

8. The differential gear in accordance with claim 7, wherein the pressure piston and the force-introduction disk form a single component.

9. The differential gear in accordance with claim 1, wherein the intermediate gear comprises a second planetary unit that is provided with the second driven shaft.

10. The differential gear in accordance with claim 1, wherein the active surfaces are provided entirely within the first area defined by the first plane and entirely within the second area defined by the second plane.

11. The differential gear in accordance with claim 1, wherein the planetary wheel support comprises a support ring at least at one of the first and second areas, which is designed with a friction coating layer applied to a base body, and through which a required braking torque can be transferred to the planetary unit via the active surfaces, and wherein one of the active surfaces is a side of the support ring facing away from the planetary wheel pair and is provided with a friction coating for working together with the brake device.

12. A differential gear for a motor vehicle, comprising:
 a powered drive cage;
 a first driven shaft and a second driven shaft connected with the drive cage via a planetary or differential gear;
 a stationary gear housing;
 an intermediate gear with a planetary unit is provided with the first driven shaft, the planetary unit comprising:
  a planetary wheel support; and
  a planetary wheel pair comprising a first planetary wheel and a second planetary wheel arranged coaxially with respect to each other and are connected with each other so as to be fixed against rotation relative to each other, the first planetary wheel and the second planetary wheel having different effective diameters, wherein the planetary wheel pair is arranged on planetary wheel pair shafts, which are connected with the planetary wheel support;
 a first sun wheel, which is connected with the drive cage so as to be fixed against rotation relative to the drive cage and is engaged with the first planetary wheel;
 a second sun wheel, which is connected with the second driven shaft so as to be fixed against rotation relative to the second driven shaft and is arranged coaxially with the first sun wheel;
 a brake device comprising:
  a breaking force applicator which causes a breaking action that generates a braking torque that brakes the planetary unit with respect to the stationary gear housing, and wherein the planetary unit comprises active surfaces for introducing the breaking torque into the planetary unit, wherein the active surfaces are provided within a first area defined by a first plane laterally spaced from the planetary wheel pair and within a second area defined by a second plane laterally spaced from the planetary wheel pair, wherein the planetary wheel pair is substantially positioned between the first and second areas and the first and second planes are perpendicularly intersected by an axis of rotation of the planetary wheel pair; and
 wherein the planetary wheel support comprises a support ring at least at one of the first and second areas, which is designed with a friction coating layer applied to a base body, and through which a required braking torque can be transferred to the planetary unit via the active surfaces, and wherein one of the active surfaces is a side of the support ring facing away from the planetary wheel pair and is provided with a friction coating for working together with the brake device.

13. A differential gear for a motor vehicle, comprising:
 a powered drive cage;
 a first driven shaft and a second driven shaft connected with the drive cage via a planetary or differential gear;
 a stationary gear housing;
 an intermediate gear with a planetary unit is provided with the first driven shaft, the planetary unit comprising:
  a planetary wheel support; and
  a planetary wheel pair comprising a first planetary wheel and a second planetary wheel arranged coaxially with respect to each other and are connected with each other so as to be fixed against rotation relative to each other, the first planetary wheel and the second planetary wheel having different effective diameters, wherein the planetary wheel pair is arranged on planetary wheel pair shafts, which are connected with the planetary wheel support;
 a first sun wheel, which is connected with the drive cage so as to be fixed against rotation relative to the drive cage and is engaged with the first planetary wheel;
 a second sun wheel, which is connected with the second driven shaft so as to be fixed against rotation relative to the second driven shaft and is arranged coaxially with the first sun wheel;
 a brake device comprising:
  a breaking force applicator which causes a breaking action that generates a braking torque that brakes the planetary unit with respect to the stationary gear housing, and wherein the planetary unit comprises active surfaces for introducing the breaking torque into the planetary unit, wherein the active surfaces are provided within a first area defined by a first plane laterally spaced from the planetary wheel pair and within a second area defined by a second plane laterally spaced from the planetary wheel pair, wherein the planetary wheel pair is substantially positioned between the first and second areas and the first and second planes are perpendicularly intersected by an axis of rotation of the planetary wheel pair; and
wherein the active surfaces do not extend beyond a height of the planetary wheel pair as measured in a direction perpendicular to the axis of rotation.

14. The differential gear in accordance with claim 13, wherein the active surfaces are provided entirely within the first area defined by the first plane-and entirely within the second area defined by the second plane.

* * * * *